United States Patent [19]

Kaneshiro

[11] 4,420,182

[45] Dec. 13, 1983

[54] COLLAPSIBLE TRAILER

[76] Inventor: Edward S. Kaneshiro, 452 Harbor Ter., Bartlett, Ill. 60103

[21] Appl. No.: 321,127

[22] Filed: Nov. 13, 1981

[51] Int. Cl.³ .............................................. B60P 3/32
[52] U.S. Cl. .................................... 296/158; 135/89; 296/168; 296/62
[58] Field of Search ............... 296/156, 158, 173, 168, 296/62; 135/1 A

[56] References Cited

U.S. PATENT DOCUMENTS

| | | | |
|---|---|---|---|
| Re. 27,605 | 3/1973 | Laney | 296/173 |
| 2,481,230 | 9/1949 | MacDonald | 296/62 |
| 2,837,778 | 6/1958 | Kern | 296/173 |
| 2,843,418 | 7/1958 | Gray | 296/173 |
| 3,325,206 | 6/1967 | Carlson | 296/173 |
| 3,731,831 | 5/1973 | Huff | 296/37.1 |
| 3,734,558 | 5/1973 | Stead | 296/158 |
| 3,822,798 | 7/1974 | Neff | 296/158 |
| 3,923,335 | 12/1975 | Erickson | 296/158 |
| 4,191,388 | 3/1980 | Barksdale | 296/62 |

Primary Examiner—Bruce H. Stoner, Jr.
Assistant Examiner—John A. Carroll

[57] ABSTRACT

A collapsible camping trailer or camper having a horizontal top panel which serves as the ceiling of the camper in the opened position and as a flat storage bed when the camper is in the collapsed position. A rigid front panel is pivotally affixed at its upper end to one edge of the top panel and has tracking members at its lower end received by a pair of channels in the camper floor. The rigid front panel collapses from a vertical position when the trailer is opened to a horizontal collapsed position between the camper floor and the top panel which also collapses, when in the closed storage position. There are corner supports affixed to another edge of the top panel which also pivot between opened and closed positions to add structural stability to the camper when in the opened position. The top panel also can be provided with guide ways which can be used as a storage bed for two-wheeled vehicles when the camper is in the collapsed storage position.

7 Claims, 4 Drawing Figures

COLLAPSIBLE TRAILER

BACKGROUND AND SUMMARY OF THE INVENTION

This invention relates to camping trailers and, more particularly, to a camping trailer which is collapsible between opened and closed storage positions.

Camping trailers or campers have been designed in many configurations over the years. One popular design is a camper which is pulled behind an automobile and has a collapsed height which is less than the height of the top of the automobile trunk. This allows the driver of the automobile to see out of his back window without obstructing his view as is normal when pulling a full-size trailer. At the campgrounds, the camper is opened up. Frame supports are placed over the supports forming an enclosed camper. In this type of design, the only rigid wall of the camper is the floor. All other sides and roof are canvas.

Another type of camping trailer is similar to the above-mentioned type except it has a rigid roof. When in the collapsed position, the camper is substantially the same size as the previous described design, thus giving the driver of the automobile the advantge of being able to again use his rear window. When this camper is to be opened, the roof pops up and is supported by means of braces at its corners. Canvas is still utilized to form the sides of the camper. Entrance to the opened camper is accomplished by a zippered door which allows the user to part the canvas allowing him to enter or exit.

There are various problems associated with campers of the described prior designs. One shortcoming is that when the camper is in the collapsed position, it generally does not allow or permit additional storage of articles on top of the collapsed camper. This is generally a result of the design of the collapsible top. Normally the top and sides are collapsed into a central area of the collapsed camper which results in the top of the collapsed camper being substantially the same height as the sides of the trailer frame. This is also approximately the height of the trunk of an automobile.

Another problem associated with the campers of the prior art is that they do not use a substantially rigid panel for any of the side walls. It is preferred to have solid panels for the roof and at least one side wall to add structural stability to the opened camper. Another related problem is that prior campers do not have a solid, lockable front door but rather usually rely upon a zippered canvas as an entrance or exit.

When it was desirable to tow the camping trailer behind a car and also bring along several two-wheeled vehicles, carrier devices which would support these two-wheeled vehicles normally had to be hung from the back of the camping trailer. Quite often only one two-wheeled vehicle could be added by means of hooks or similar devices to the camper. At other times, hooks could be added to the front of the towing vehicle if it was a truck, but this would at times interfere with the driver's view of the road.

The present invention is directed to a camper/trailer which has a rigid panel which serves as a solid roof when the camper is in the opened position, and serves as a flat storage bed for wheeled vehicles when the camper is in the closed position. There is a rigid front panel which collapses and is stored between the camper floor and the top panel when collapsed to the stored position, and opens to provide a solid panel which has a door when the camper is in the opened position. The design also permits the top panel to fold down very close to the trailer frame. Thus wheeled vehicles or other objects can be placed on the top panel when in its closed position without unduly interfering with the driver's rear view and without raising the center of gravity of the trailer to such an extent that the trailer or stored objects are unsafe.

There are also provided corner supports to give added structural support to the top panel when the trailer is opened. The corner supports pivot to a flat position along the camper floor when the trailer is collapsed. There are also storage compartments with removable tops along each side of the trailer. When the camper is to be opened, the storage compartments are opened and canvas material is drawn out from the storage compartments to the raised top panel thus forming side walls. A short ramp is also provided from the trailer to the ground so that the stored wheeled vehicles can be rolled off the top panel when the camper is collapsed. The ramp also is provided with a collapsible step to allow the user easy access into and out of the camper.

Thus, it is an object of the present invention to provide a camping trailer which is collapsible from an opened position to a collapsed storage position.

Another object is to provide a collapsible camping trailer which has a dual function rigid panel which serves as a roof in its opened position and as a storage bed when in the collapsed storage position.

Another object is to provide a collapsible trailer which has a rigid panel for one of the side walls which also collapses to a substantially flat horizontal position when the camping trailer is in the collapsed position.

Another related object is to provide a camping trailer which has improved structural strength as compared to those in the prior art, yet takes up less space when in the collapsed storage position.

Another object is to provide a camper with storage compartments along its sides so that the roof can be stored adjacent to the trailer floor thereby providing additional storage area when the camper is in the closed position.

Many other objects and purposes of the invention will be clear from the following detailed description of the invention.

DESCRIPTION OF THE PREFERRED EMBODIMENT

Figure 1:
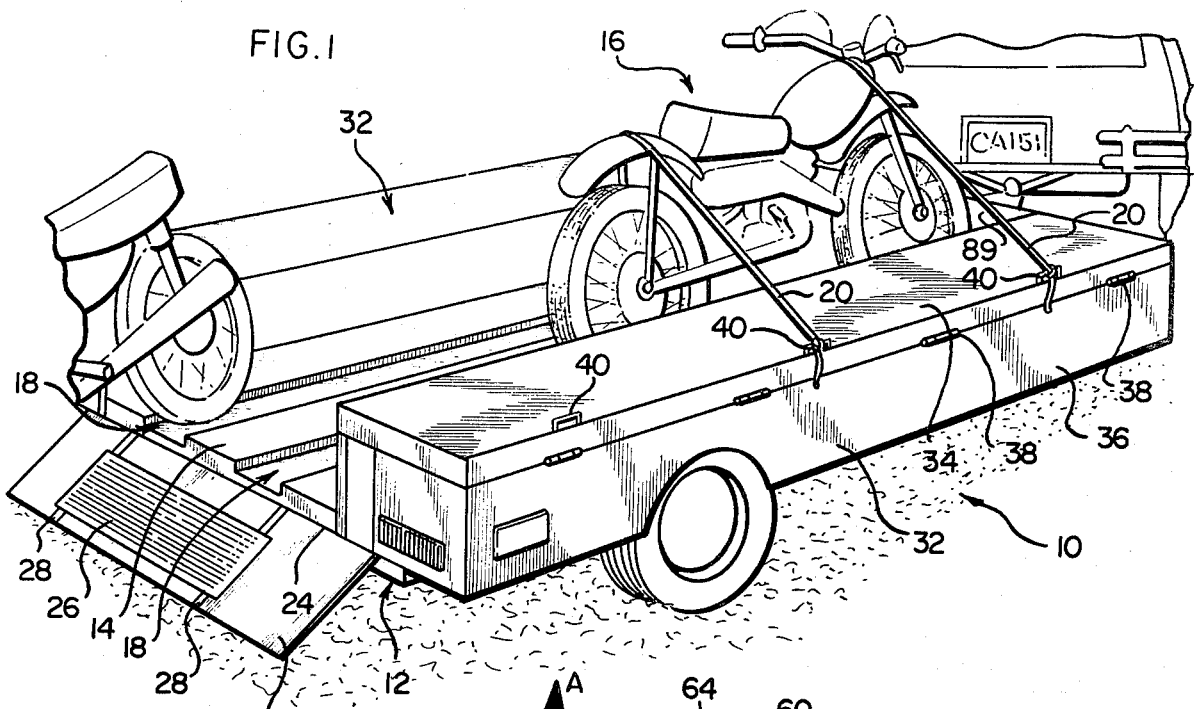
FIG. 1 is a perspective view of the camping trailer in the collapsed position with a motorcycle on the trailer's storage bed.

Turning first to FIG. 1 there is illustrated a collapsible camping trailer or camper 10. The camper 10 rests on a basic support structure or frame 12 which generally has a length in the same direction as the direction the camper is pulled and a width perpendicular to the length.

Supported above the frame 12 is a rigid top panel 14. When the camper is in a closed position, the top panel 14 acts as a storage bed. As seen in FIG. 1, there is a motorcycle 16 which can be stored on the top panel 14. In order to provide easy control of movement of the motorcycle 16 along the top panel 14, there are guide ways 18 along which the motorcycle 16 can be guided. Also, while the camper is being pulled, in order to keep the motorcycle 16 from falling over or shifting, tie downs 20 are provided to hold the motorcycle 16 in place.

At the back of the frame 12 there is provided a ramp 22 which can be fastened to the frame in any one of several ways. One method would be to hinge the ramp along edge 24 so that the edge of the ramp 22 opposite edge 24 could be dropped from a vertical storage position down so that it rests against the ground. Another method would be to merely provide a groove into the frame 12 and simply slide the ram underneath the frame 12 during transport.

Figure 4:
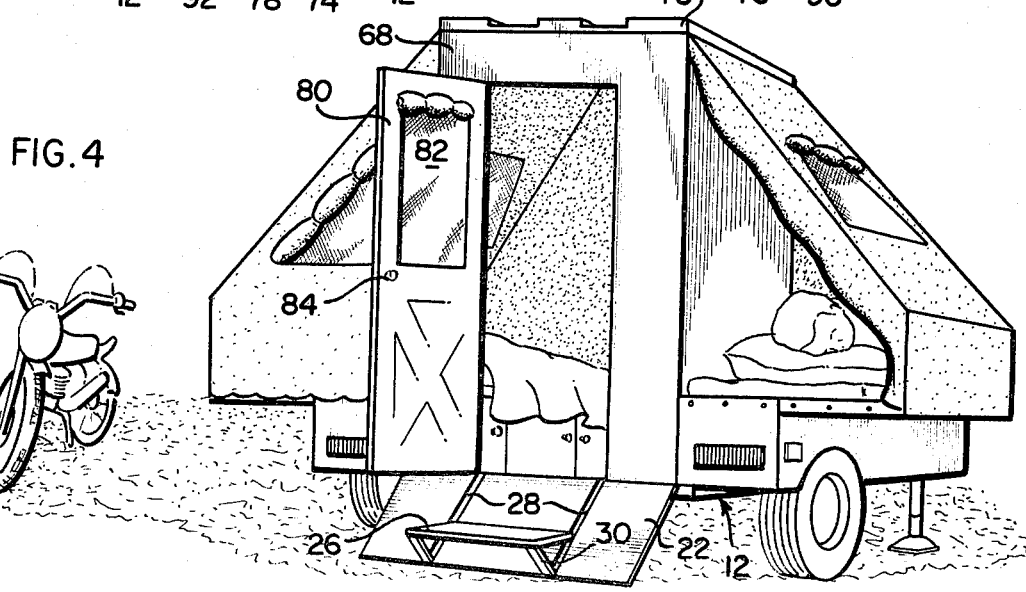
FIG. 4 is a perspective view of the camping trailer in the opened, assembled position.

The ramp 22 is preferably also provided with a step 26 which can be collapsed flat with the ramp 22 or opened to provide a stepped access to the camper as best seen in FIG. 4. The step can be contained at its edges by means of channels 28 and braces 30 which would allow the step to pivot between its flush parallel position with the ramp 22 to a substantially horizontal position relative to the ground when the camper is in its opened position.

The camper 10 also has lateral storage compartments 32 along each side of the frame 12. The storage compartments 32 have a top 34 which is hinged to an outer side wall 36 by means of hinges 38. There are also hooks 40 provided at the top 34 so that the tie downs 20 can be anchored to the hooks 40. When the camper is to be opened, the top 34 can be pivoted 180° from its closed position to an opened position such as illustrated in FIG. 4. The outer side wall 36 provides the stopping means necessary to allow the top 34 to remain in a substantially horizontal position relative to the ground when fully opened. This can provide a relatively flat sleeping surface as seen in FIG. 4.

Figure 2:
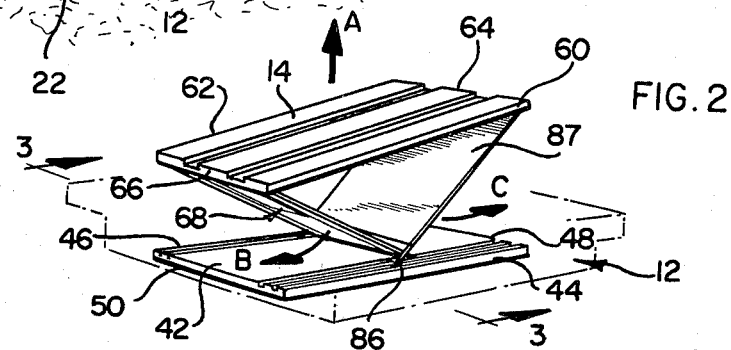
FIG. 2 is a perspective view of the collapsible portions of the camping trailer with the trailer frame shown in phantom.
Figure 3:
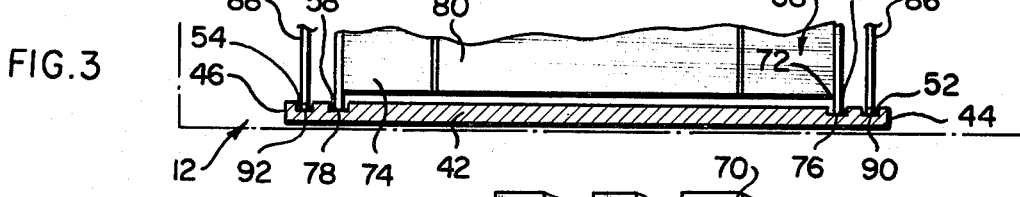
FIG. 3 is a cross-sectional view with portions removed and taken along line 3—3 of FIG. 2.

FIGS. 2 and 3 more clearly illustrate the means to open and collapse the camper 10. A substantially rectangular camper floor 42 is attached to the frame 12. The camper floor 42 has side edges 44, 46 and front and back edges 48, 50, respectively. In the camer floor 42 is a first pair of channels 52, 54. The channels 52, 54 are parallel to each other and to the sides 44, 46. A second pair of channels 56, 58 are also parallel to each other and parallel to the first pair of channels 52, 54. The first pair of channels are placed closer to the edges 44, 46 than the second pair of channels 56, 58. The channels are preferably of a design such that they form a key way and will slidably retain a number so that it can slide along its length yet not be inadvertently drawn out from the channels.

The rigid top panel 14 has side edges 60, 62 and front and back edges 64, 66, respectively. The edges of the top panel 14 are parallel to the edges of the camper floor 44. Likewise, the plane of the top panel 14 is parallel to the plane of the camper floor 42 whether the top panel is in its stored or opened position.

A rigid front panel 68 is pivotally connected between the rigid top panel 14 and the camper floor 42. The front panel 68 has a top edge 70 which is pivotally connected to the front edge 66 of the top panel 14. A connection can easily be made by using hinges or other similar pivotal devices. Opposite the top edge 70 are bottom corners 72, 74 which have bottom studs 76, 78 protruding down below the bottom edge of the front panel 68. The studs 76, 78 are received in the second pair of channels 56, 58 respectively. As previously mentioned, the channels should receive the studs in such a manner that the studs can slide along the length of the channels yet not be pulled out unless intended. The front panel 68 also has a door 80 which is hinged along one of its edges in a conventional manner. The door also could be provided with a window 82 and locking handle 84 also of conventional designs.

There also are provided corner supports 86, 88 as best illustrated in FIG. 2. The top of the corner supports 86, 88 are pivotally connected by means of pins to the side edges 60, 62 near the front edge 64 of the rigid top panel 14. Bottom corners 90, 92 of the corner supports 86, 88 are received in the first pair of channels 52, 54, respectively. Again, the channels are designed so that the corners supports can slide within the channel and not be unintentionally removed. A rigid back panel 87 is secured between the corner supports 86, 88 and extends from the top panel 14 to a height generally corresponding to the height of the back wall 89 of the camper 10, for reasons set forth below.

To open the trailer when it is in the collapsed position, the top panel 14 is first raised in the direction shown in FIG. 2 by arrow A by lifting the front edge 66. Once the front edge 66 is lifted above the storage compartments 32, the other side edges 60, 62 are accessible to be grasped by the users to aid in raising the top 14. Springs could be placed in the channels to aid in lifting the corner supports and top. The front panel 68 moves in the direction indicated by arrow B and pivots along its top edge 70 and the rear edge 66 due to the hinge connection. The bottom studs 76, 78 slide within the second pair of channels 56, 58 and also simultaneously allow the front panel 68 to pivot at the bottom studs. The corner supports 86, 88 of the back panel 87 move in the direction indicated by arrow C. The tops of the corner supports 86, 88 also pivot due to the pinned connection to the sides 60, 62. Similarly, the bottom corners 90, 92 slide within the first pair of channels 52, 54 and pivot within the channel.

When in the stored position, the front panel 68 rests against the camper floor 42 with both in a horizontal plane. The back panel 87 is sandwiched between the front panel 68 and the top plane 14. The shorter length of the back panel 87 permits the front panel 68 to slide beneath it, as generally illustrated in FIG. 2. The bottom corners 90, 92 are placed in the outward pair of channels 56, 58. Thus, the corner supports will be stored along side and outward from the side edges 60, 62.

When in the fully opened position, the front and rear panels 68, 87 are vertical and perpendicular to the camper floor 42. The top panel 14 is parallel to the floor 42 and the ground. Releasable locking means could be provided in the first pair of channels 52, 54 and second pair of channels 56, 58, which will lock the front panel 68 and corner supports 86, 88 in the vertical position until such time as the trailer is to be collapsed. The locking means can then be released allowing the bottom studs 76, 78 and bottom corners 90, 92 to slide past the locks along the length of the channels. Such locking means are of conventional design.

As seen in FIG. 4, the front panel 68, the rear panel 87 and top panel 14 along with the floor 42 are the only rigid walls of the camper 10. The balance of the camper can be formed from stretching canvas or other suitable cloth-like materials around the remaining outside areas to form the walls.

Thus it is apparent that there has been provided, in accordance with the invention, a collapsible trailer or camper that fully satisfies the objects, aims, and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

Now that the invention has been described, what is claimed as new and desired to be secured by Letters Patent is:

1. A camping trailer which is collapsible from an opened position to a collapsed storage position comprising:
   a substantially rectangular trailer frame having a length and width;
   a horizontal camper floor connected to the frame, the camper floor having two camper floor sides parallel to the length, and front and back sides parallel to the width;
   two pairs of channels in the camper floor, each pair parallel to the other and parallel to the camper floor sides;
   a substantially rectangular rigid top panel having two side edges and front and back edges, the two side edges parallel to the two sides of the camper floor, and the front and back edges parallel to the front and back sides of the camper floor;
   a rigid front panel with a top edge pivotally affixed to the front edge of the top panel, the rigid front panel having bottom tracking means slidably received by one pair of the channels;
   support means pivotally affixed to the back edge of the top panel and having a rigid back panel secured thereto, the support means also having a second bottom tracking means slidably received by the second pair of channels;
   the rigid front panel is collapsible from an opened upright position to a collapsed horizontal storage position above the camper floor;
   the support means and rigid back panel secured thereto are collapsible from an opened upright position to a collapsed substantially horizontal storage position above the camper floor;
   the rigid top panel is collapsible from an opened horizontal position to a collapsed horizontal storage position above the collapsed rigid front and back panels;
   the tracking means sliding within the two pairs of channels during the collapsing and opening of the top panel, and the top panel functioning as a ceiling or roof when the trailer is in the opened position and functioning as a flat storage bed in the collapsed position
   whereby the top panel, rigid front panel and rigid back panel are stacked adjacent each other in the collapsed position.

2. The camping trailer of claim 1 and further comprising a storage compartment adjacent each of the two sides of the camper floor, the storage compartment having a removable top and containing a clothlike material which is drawn up around the sides of the camper floor to the top panel when in the opened position to form clothlike walls.

3. The camping trailer of claim 2 wherein the storage compartment is hinged at the top and the top is opened when the trailer is in the opened position to form a sleeping compartment.

4. The camping trailer of claim 1 wherein the rigid top panel has top and bottom surfaces and the top surface has guideways parallel to the side edges, the guideways dimensioned to receive a two-wheeled vehicle when the trailer is in the collapsed position.

5. The camping trailer of claims 1 or 4 and further comprising ramp means operatively mounted adjacent the back side of the camper floor, the ramp having folding step means whereby entrance to the opened camper is simplified by stepping on the step means when in its opened position, and rolling of two-wheeled vehicles onto the top panel is simplified when it its collapsed position by providing a smooth ramp surface.

6. The camping trailer of claims 1 or 4 wherein the support means are rods and the secod pair of channels are placed closest the camper floor sides outward of the one pair of channels, and the rigid front panel collapses between the rods when the trailer is collapsed to the storage position.

7. The camping trailer of claims 1 or 4 and further comprising a door mounted in the rigid front panel to provide a closable entrance to the trailer when in the opened position.

* * * * *